United States Patent
Kurecka et al.

(12) 
(10) Patent No.: US 6,336,868 B1
(45) Date of Patent: Jan. 8, 2002

(54) UNIVERSAL JOINT WITH THRUST WASHER

(75) Inventors: Donald J. Kurecka; Salvatore N. Grupido, both of Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/540,221

(22) Filed: Mar. 31, 2000

Related U.S. Application Data

(60) Provisional application No. 60/127,940, filed on Apr. 6, 1999.

(51) Int. Cl.[7] ................................................. F16D 3/16
(52) U.S. Cl. ........................ 464/134; 464/136; 384/425
(58) Field of Search ................................ 464/128, 129, 464/130, 131, 132, 133, 134, 136; 384/905.1, 425

(56) References Cited

U.S. PATENT DOCUMENTS

| | | | |
|---|---|---|---|
| 3,937,541 A | | 2/1976 | Alling et al. |
| 4,130,325 A | * | 12/1978 | Schultenkamper .......... 464/131 |
| 4,650,440 A | | 3/1987 | Fisher |
| 4,776,237 A | | 10/1988 | Premiski et al. |
| 4,875,787 A | | 10/1989 | Bauer et al. |
| 5,106,342 A | | 4/1992 | Fisher |
| 5,725,431 A | | 3/1998 | Myers et al. |
| 5,795,800 A | * | 8/1998 | Rhoades et al. ............ 464/130 |
| 5,813,916 A | | 9/1998 | Lentini et al. |
| 5,829,888 A | | 11/1998 | Bhargava et al. |
| 5,846,001 A | | 12/1998 | Muntnich et al. |
| 5,865,678 A | | 2/1999 | Koedam et al. |
| 6,129,634 A | * | 10/2000 | Nieman ....................... 464/132 |
| 6,162,126 A | * | 12/2000 | Barret et al. ................ 464/134 |

FOREIGN PATENT DOCUMENTS

| JP | 9-105422 | * | 4/1997 |
|---|---|---|---|

* cited by examiner

Primary Examiner—Lynne H. Browne
Assistant Examiner—Aaron Dunwoody
(74) Attorney, Agent, or Firm—Harness, Dickey & Pierce, P.L.C.

(57) ABSTRACT

A universal joint for interconnecting a pair of rotating shafts and a method of assembling the universal joint. The universal joint includes a pair of yokes secured to the shafts and a cruciform for interconnecting the yokes. Both yokes are bifurcated to define a pair of laterally-spaced legs. Each leg has an aperture which includes a first bore adapted to receive a bearing cup therein and a second bore into which an end portion of the bearing cup extends. Each bearing cup rotatably supports one of four orthogonal trunnions extending from the cruciform. With respect to each of the yokes, a pair of axially-aligned trunnions, with bearing cups mounted thereon, are installed into the apertures so as to support the cruciform between the legs of the yoke. Thereafter, a retention member is inserted in the second bore of each aperture such that one surface of the retention member rests on the bearing cup. After the rotary axis of the first shaft is aligned with the rotary axis of the second shaft, an edge portion of the legs surrounding the second bore of each aperture is deformed to define one or more projections which engage the opposite surface of the retention member. The projections secure the retention members within the second bore of the apertures, thereby fixing the axial position of the bearing cups and trunnions relative to the yoke.

38 Claims, 4 Drawing Sheets

UNIVERSAL JOINT WITH THRUST WASHER

CROSS-REFERENCE TO RELATED APPLICATION

This application is based upon and claims priority to United States Provisional Patent Application Serial No. 60/127,940 filed Apr. 6, 1999, and entitled UNIVERSAL JOINT WITH THRUST WASHER, the specification and drawings of which are herein expressly incorporated by reference.

BACKGROUND OF THE INVENTION

The present invention relates generally to universal joints for use in motor vehicle driveline applications. More particularly, the present invention relates to an improved structure for a thrust washer for use in a bearing cup assembly that is adapted to be mounted on a cruciform trunnion as part of a universal joint.

As is well known, universal joints are used in motor vehicle driveline applications for interconnecting a pair of rotary shafts in a manner which accommodates changes in the angularity therebetween. Most conventional universal joints include a pair of bifurcated yokes which are secured to the shafts and which are interconnected by a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to a pair of the trunnions. In addition, it is known to use a thrust washer between the trunnion and the bearing cup to absorb the radially-directed thrust forces which may occur therebetween.

SUMMARY OF THE INVENTION

Further areas of applicability of the present invention will become apparent from the detailed description provided hereinafter. It should be understood however that the detailed description and specific example, while indicating a preferred embodiment of the invention, is intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
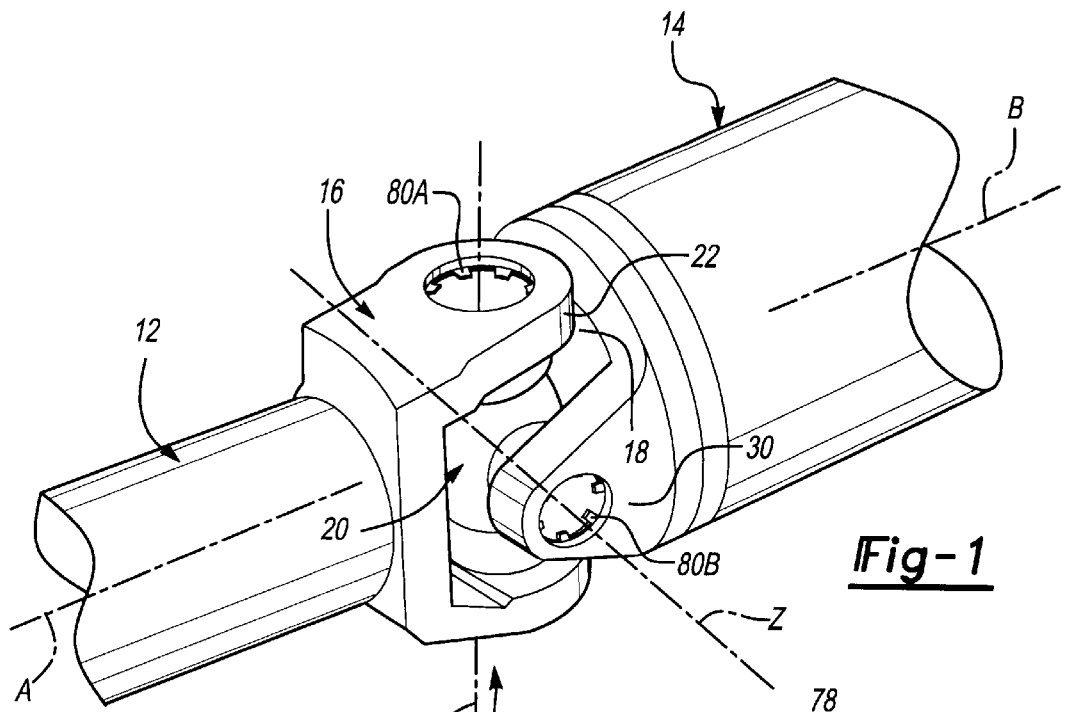
FIG. 1 is a perspective view of a universal joint according to the principles of the present invention.

In general, the present invention is directed to a universal joint of the type used in motor vehicle driveline applications for interconnecting rotating shafts in a manner permitting changes in angularity therebetween. The present invention is further directed to a cruciform assembly for interconnecting the yokes of such a universal joint. Still further, the present invention is directed to a thrust washer used in a bearing cup assembly which is installed on the cruciform assembly.

Referring to the drawings, a universal joint 10 is shown connecting a first shaft 12 to a second shaft 14. In general, universal joint 10 includes a first yoke 16 attached to first shaft 12, a second yoke 18 attached to second shaft 14, and a cruciform assembly 20 interconnecting first yoke 16 and second yoke 18. First yoke 16 is bifurcated and includes a pair of laterally-spaced lugs 22 which are preferably symmetrical with respect to the rotary axis of first shaft 12, as denoted by construction line "A". Lugs 22 includes an inboard surface 24 and an outboard surface 26 with an aperture 28 extending therebetween. Apertures 28 are aligned on a first trunnion axis, as denoted by construction line "Y", which passes through and is orthogonal with respect to rotary axis "A" of first shaft 12. Second yoke 18 is bifurcated and includes a pair of laterally-spaced lugs 30 which are preferably symmetrical with respect to the rotary axis of second shaft 14, as denoted by construction line "B". Lugs 30 include an inboard surface 32 and an outboard surface 34 with an aperture 36 extending therebetween. Apertures 36 are aligned on a second trunnion axis, as denoted by construction line "Z", which passes through and is orthogonal with respect to rotary axis "B" of second shaft 14.

Figure 2:
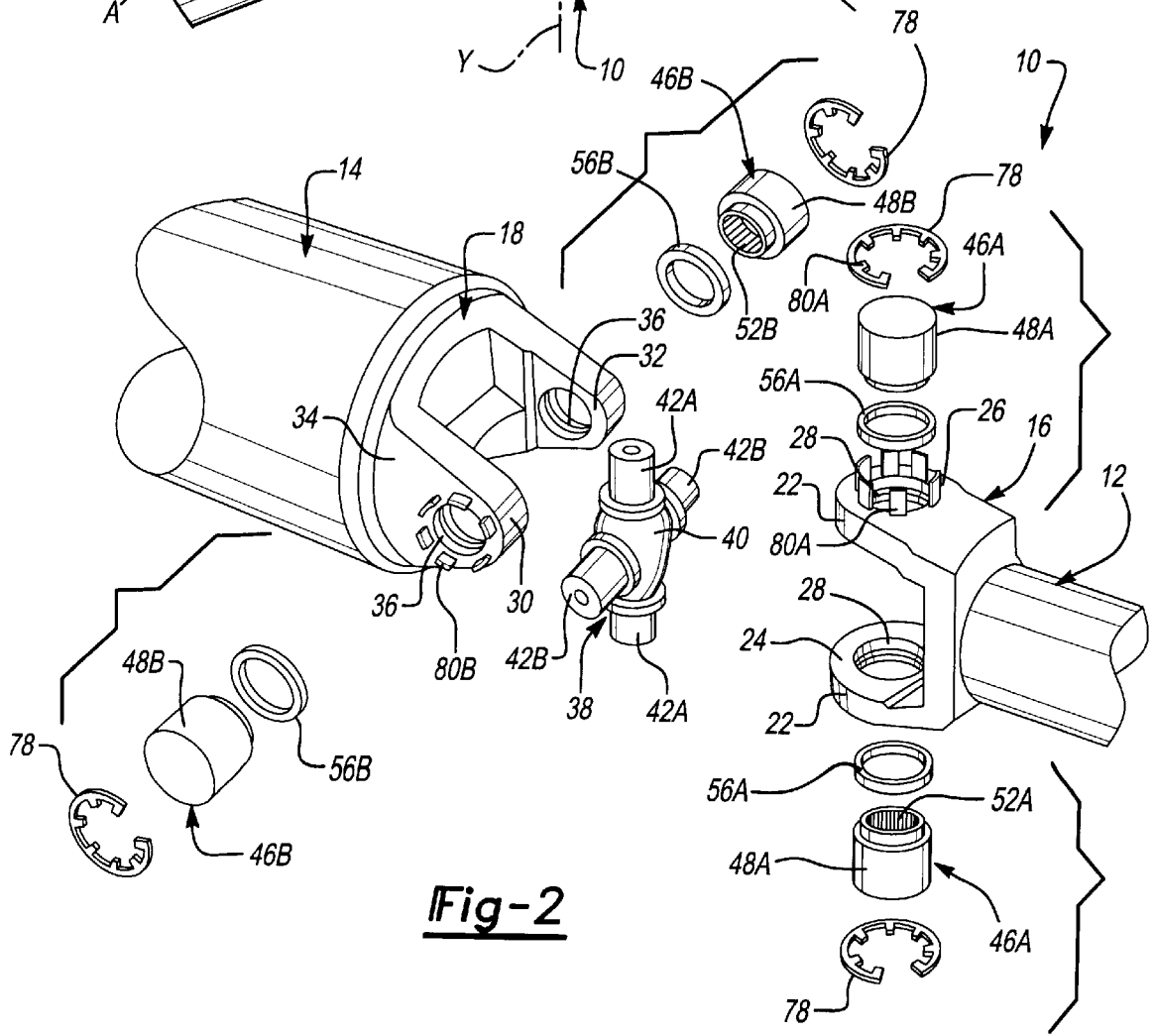
FIG. 2 is an exploded perspective view of the universal joint shown in FIG. 1.
Figure 3:
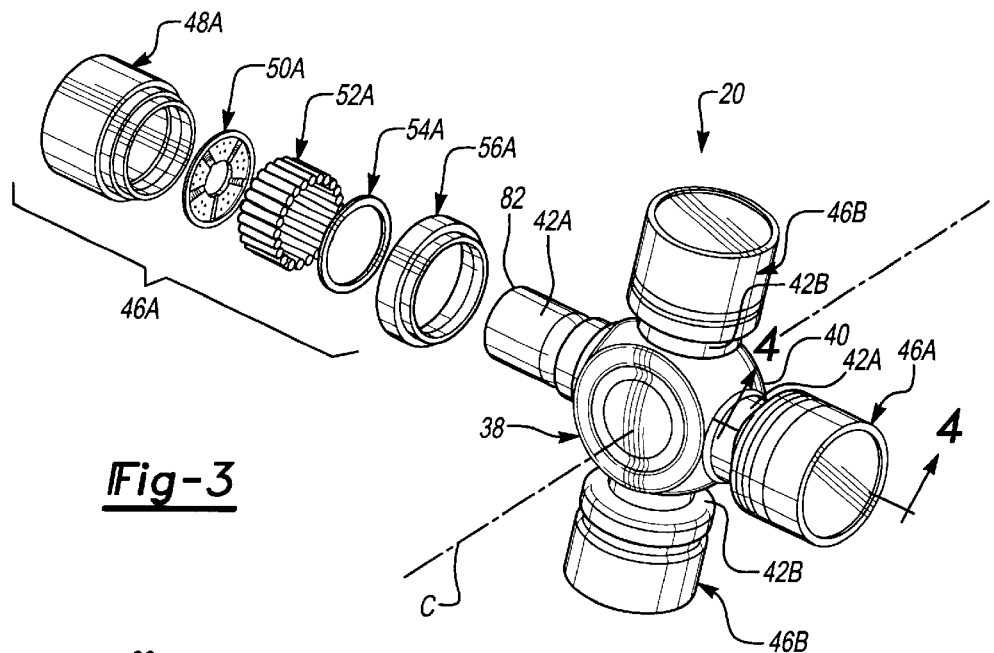
FIG. 3 is a pictorial view of the cruciform assembly shown in FIG. 2 with one bearing cup assembly shown in an exploded view.

As best seen in FIGS. 2 and 3, cruciform assembly 20 includes a cross member 38 having a central hub 40 from which a pair of first trunnions 42A and a pair of second trunnions 42B extend. First trunnions 42A are orthogonal with respect to second trunnions 42B, with all of the trunnions aligned within a common plane. First trunnions 42A are cylindrical and are adapted for insertion into apertures 28 in lugs 22 of first yoke 16 so as to be axially aligned on first trunnion axis "Y". Similarly, second trunnions 42B are cylindrical and are adapted to be inserted into apertures 36 in lugs 30 of second yoke 18 so as to be axially aligned on second trunnion axis "Z". Preferably, first trunnions 42A and second trunnions 42B are identical in size and shape. With first trunnions 42A and second trunnions 42B installed respectively in first and second yokes 16 and 18, trunnion axes "Y" and "Z" pass through a common plane which orthogonally intersects the rotary axis of cruciform assembly 20, as shown in FIG. 3 by construction line "C".

Universal joint 10 also includes a first pair of bearing cup assemblies 46A adapted to be mounted in apertures 28 and a second pair of bearing cup assemblies 46B adapted to be mounted in apertures 36. First bearing cup assemblies 46A are provided for receiving and rotatably supporting first trunnions 42A in apertures 28. Similarly, second bearing cup assemblies 46B are provided for receiving and rotatably supporting second trunnions 42B in apertures 36. Preferably, bearing cup assemblies 46A and 46B are identical. For purposes of brevity, the following description will be limited to the components of bearing cup assemblies 46A with it understood that the corresponding components of bearing cup assemblies 46B are substantially identical and, where necessary, are identified by common reference numeral with a "B" suffix.

Figure 4:
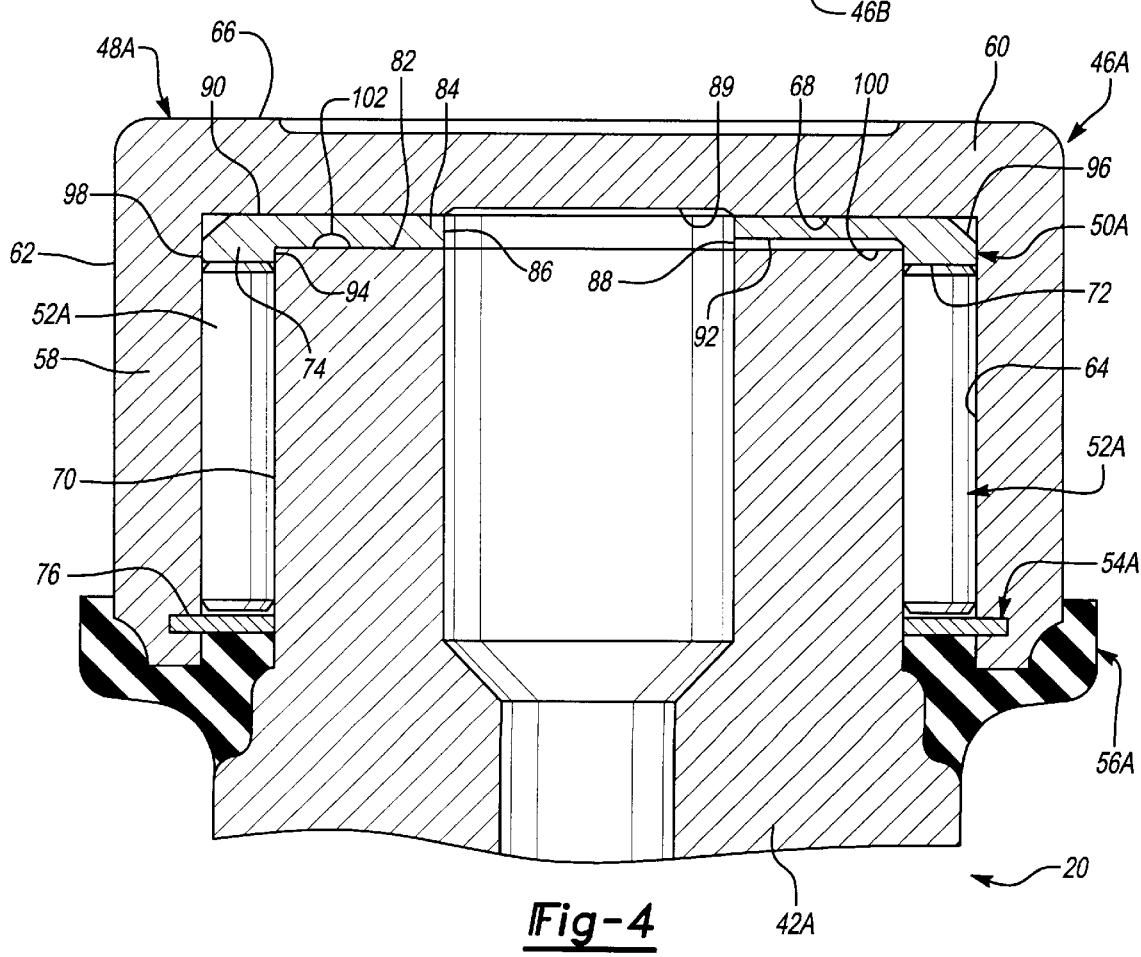
FIG. 4 is a partial sectional view taken generally along line 4—4 of FIG. 3 and showing the bearing cup assembly installed on the trunnion.
Figure 5:
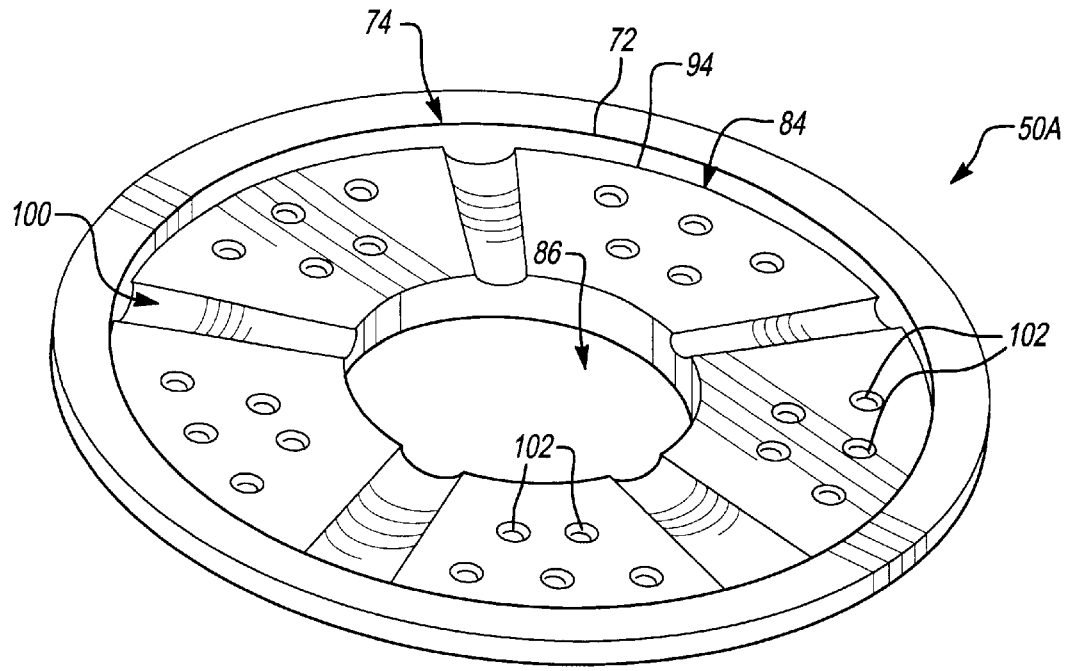
FIG. 5 is a pictorial view of the thrust washer associated with the bearing cup assembly of FIG. 3.
Figure 6:
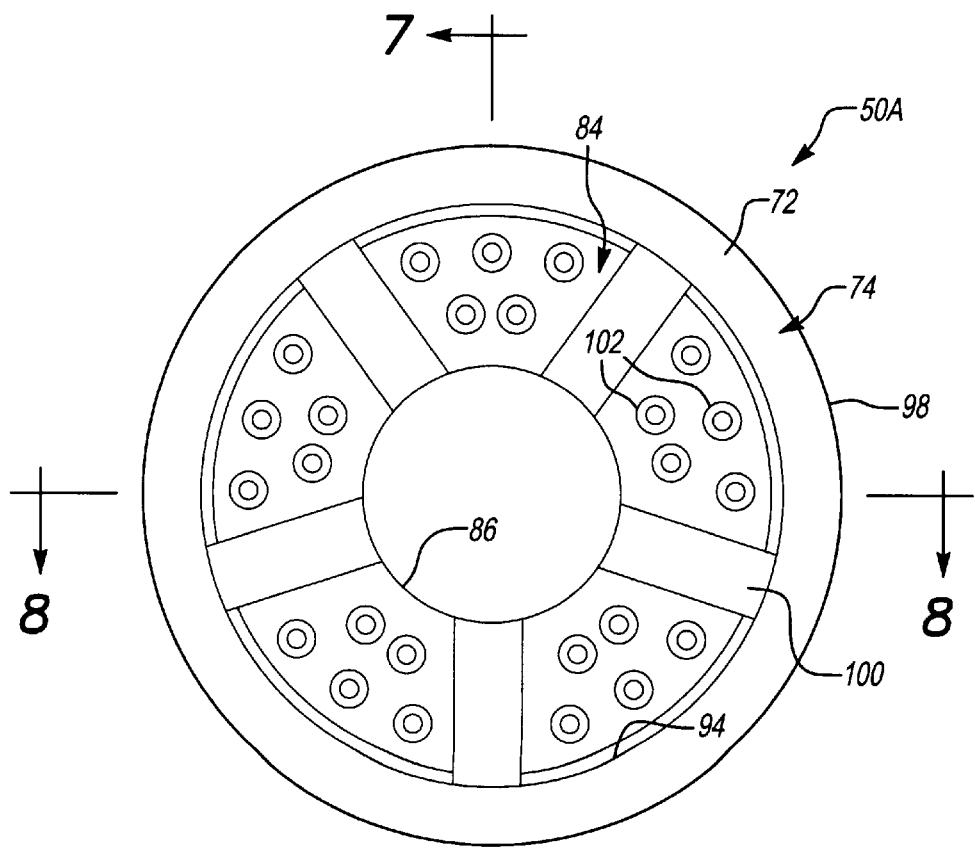
FIG. 6 is a plan view of the thrust washer.
Figure 7:
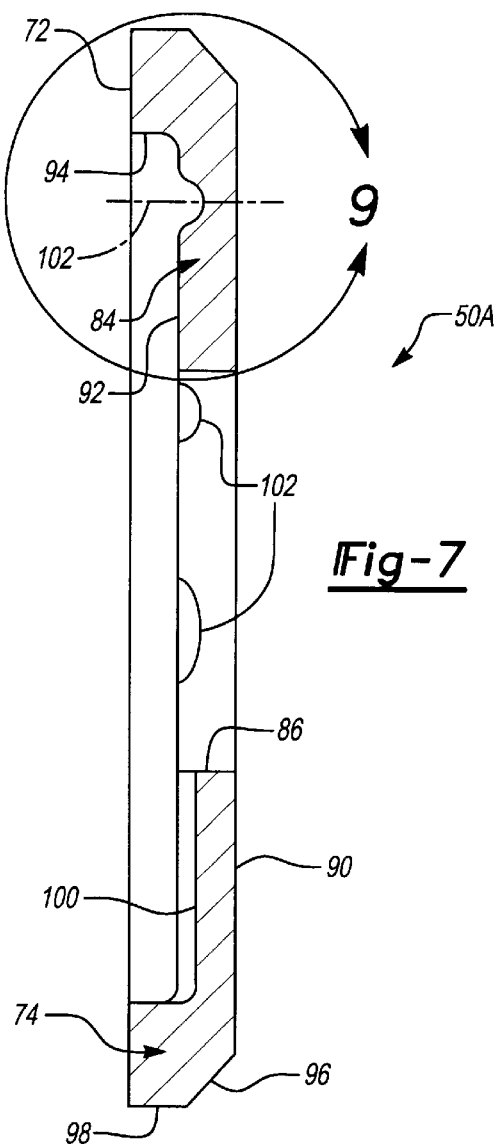
FIG. 7 is a sectional view taken generally along line 7—7 of FIG. 6.
Figure 9:
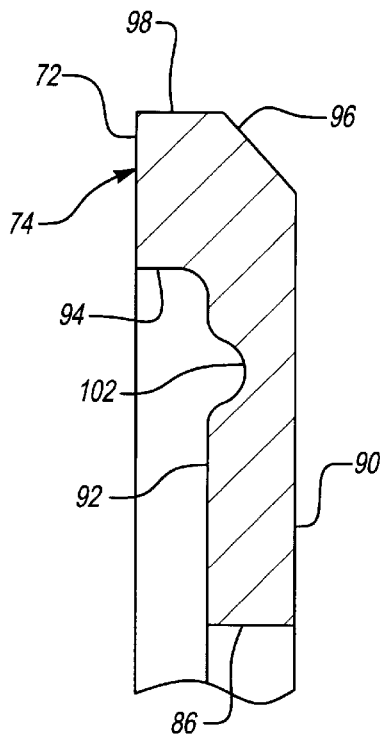
FIG. 9 is an enlarged partial view of the thrust washer generally taken from the circled portion of FIG. 7.
Figure 8:
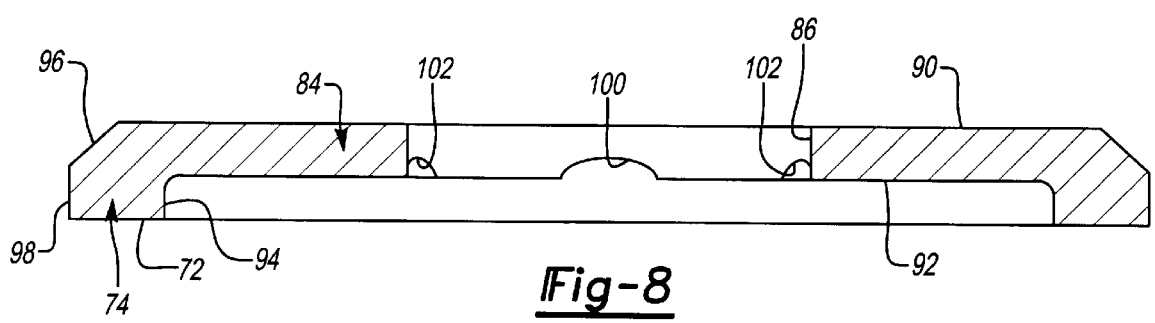
FIG. 8 is a sectional view taken generally along line 8—8 of FIG. 6.

Referring primarily to FIGS. 2 through 4, each bearing cup assembly 46A includes a bearing cup 48A, a thrust washer 50A, a set of roller bearings 52A, a bearing retainer ring 54A, and an elastomeric seal 56A. Bearing cup 48A is generally hollow and cylindrical in shape and has a cylindrical tubular segment 58 closed at one end by an end segment 60. Tubular segment 58 of bearing cup 48A defines an outer wall surface 62 adapted for retention in lug aperture 28, and an inner wall surface 64. Likewise, end segment 60 of bearing cup 48A includes an outer end surface 66 and an inner end surface 68. Roller bearings 52A are disposed between inner wall surface 64 of tubular segment 58 and an outer wall surface 70 of trunnion 42A so as to allow relative rotary movement between bearing cup 48A and trunnion 42A. Roller bearings 52A are oriented to rotate on an axis parallel to axis "A" of trunnions 42A and are arranged in a circumferential array about this axis. One end of each roller bearing is supported to roll against a bearing surface 72 formed on a raised circumferential flange segment 74 of thrust washer 50A. The opposite end of roller bearings 52A are supported to roll against a face surface of bearing retainer ring 54A which, in turn, is retained in a circumferential groove 76 formed in inner wall surface 64 of bearing cup 48A. Seal 56A extends between outer wall surface 62 of bearing cup 48A and outer wall surface 70 of trunnion 42A to protect bearings 52A against dirt and other contaminants and to retain the lubricant within bearing cup assembly 46A. Once bearing cup assemblies 46A are installed on first trunnions 42A and inserted into lug apertures 28, cross member 88 is centered and dynamically balanced. Thereafter, cruciform assembly 20 is secured to lugs 22. A known method for securing cruciform assembly 20 includes mounting of snap rings 78 in circumferential grooves (not shown) formed in apertures 28 above outer end surface 66 of bearing cups 48A. Alternatively, portions of outboard surface 26 of lugs 22 surrounding apertures 28 can be deformed (i.e., staked, peened, etc.) to create projections which engage outer end surface 66 of bearing cups 48A. Still further, projections 80A on lugs 22 can be deformed to entrap snap rings 78 against outer end surface 66 of bearing cups 48A, as is disclosed in commonly-owned and U.S. application Ser. No. 09/189,886 filed Nov. 11, 1998, now U.S. Pat. No. 6,162,126 issued Dec. 19, 2000 entitled UNIVERSAL JOINT, the entire disclosure of which is hereby incorporated by reference.

Thrust washer 50A is installed in bearing cup assembly 46A between an end surface 82 of trunnion 42A and inner end surface 68 of bearing cup 48A. Thrust washer 50A includes a disk segment 84 from which raised circumferential flange segment 74 extends. A central aperture 86 is formed through disk segment 84 and may correspond in size to the diameter of a lubricant passage 88 found in each trunnion 42A and a circular reservoir 89 in bearing cup 48A. As is conventional, a fitting (not shown) mounted on central hub 40 of cross member 38 communicates with lubricant passage 88. The fitting is used to supply lubricant to passageway 88 for lubricating roller bearings 52A as well as for providing a lubricant film between relatively movable surfaces. Disk segment 84 has an outer face surface 90 which faces and contacts inner end surface 68 of bearing cup 48A.

Likewise, disk segment 84 has an inner face surface 92 which faces and contacts end surface 82 of trunnion 42A forming a substantially constant working area. Inner face surface 92 and outer face surface 90 are planar and parallel such that disk segment 84 has a constant thickness. In addition, thrust washer 50A includes a circumferential inner wall surface 94, as defined by flange segment 74, which is adapted to face and contact outer wall surface 70 of trunnion 42A. A chamfer surface 96 connects a circumferential outer wall surface 98 of flange segment 74 to outer face surface 90 of disk segment 84.

As best seen from FIGS. 5 through 9, thrust washer 58A includes a series of lubrication grooves 100 which extend radially from central aperture 86 to inner wall surface 94 of flange segment 74. Grooves 100 are arcuate in profile to define a cylindrical wall surface. It is preferable that an odd number of grooves 100 are provided and which are equally-spaced to define a like number of pie-shaped portions of disk segment 84. In addition, a plurality of indentations or dimples 102 are formed on the pie-shaped portions of disk segment 84. Dimples 102 can be randomly oriented or, more preferably, be aligned to define two circumferential rows. Dimples 102 are adapted to retain lubricant therein to provide continuous lubrication over a large area of trunnion end surface 82. In addition, dimples 102 allow contaminants to be removed from the operating surfaces and collect therein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A universal joint comprising:
   a yoke including a leg having an aperture extending therethrough, said aperture including a first bore and a second bore;
   a cruciform having a trunnion;
   a bearing cup mounted on said trunnion, said bearing cup having a sleeve segment located in said first bore of said aperture and an end segment located in said second bore of said aperture;
   a thrust washer positioned at an end of said trunnion adjacent said bearing cup, said thrust washer having at least one channel for moving lubricant and at least one indentation for retaining lubricant; and
   a retention member having first and second surfaces, said retention member disposed within said second bore of said aperture such that its first surface engages said end segment of said bearing cup; and wherein a portion of said leg adjacent to the end of said second bore is deformed to define a projection which engages said second surface of said retention member.

2. The universal joint of claim 1 wherein said portion of said leg deformed to define said projection includes a series of lugs extending outwardly from said leg adjacent to said second bore of said aperture.

3. The universal joint of claim 2 wherein said lugs are deformed such that said projections defines a series of radial retention lugs which engage said second surface of said retention member.

4. The universal joint of claim 1 wherein said portion of said leg deformed to define said projection is a wall surface surrounding said second bore of said aperture.

5. The universal joint of claim 4 wherein said projection is a continuous flange which engages said second surface of said retention member.

6. The universal joint of claim 4 wherein said projection is a series of dimpled projections which engage said second surface of said retention member.

7. The universal joint of claim 1 wherein said portion of said leg deformed to define said projection is an upstanding annular rim segment surrounding said second bore of said aperture.

8. The universal joint of claim 7 wherein said rim segment is deformed such that said projection includes a series of radial retention lugs which engage said second surface of said retention member.

9. The universal joint of claim 7 wherein said rim segment is deformed such that said projection is a continuous retention flange which engages said second surface of said retention member.

10. The universal joint of claim 1 wherein said projection defines a retention aperture which communicates with and is smaller than said second bore of said aperture.

11. The universal joint of claim 10 wherein said bearing cup has an outer diameter that is slightly smaller than an inner diameter of said first bore, and wherein said retention aperture has an inner diameter that is larger than said outer diameter of said bearing cup.

12. The universal joint of claim 10 wherein said retention member can be removed from a groove defined between said projection and said second bore and thereafter pass through said retention aperture.

13. The universal joint of claim 12 wherein said retention member is a snap ring.

14. The universal joint of claim 1 wherein said yoke includes a second leg laterally spaced from said first leg and having a second aperture that is aligned with said first aperture in said first leg, said second aperture having a first bore and a second bore, and wherein said cruciform includes a second trunnion that is coaxial with said first trunnion, and further comprising a second bearing cup mounted on said second trunnion, said second bearing cup having a sleeve segment located in said first bore of said second aperture and an end segment located in said second bore of said second aperture, a second thrust washer positioned at an end of said trunnion adjacent said bearing cup, said second thrust washer having at least one channel for moving lubricant and at least one indentation for retaining lubricant, and a second retention member having first and second surfaces, said second retention member is disposed in said second bore of said second aperture such that its first surface engages said end segment of said second bearing cup, and wherein a portion of said second leg adjacent to said second bore of said second aperture is deformed to define a second projection engaging said second surface of said second retention member.

15. A method for assembling a universal joint, comprising the steps of:

providing a first rotary member adapted to be rotated about a first rotary axis, said first rotary member having a first yoke including a pair of first legs each having a first aperture extending therethrough, said first apertures each having a first bore and a second bore;

providing a second rotary member adapted to be rotated about a second rotary axis, said second rotary member having a second yoke including a pair of second legs each having a second aperture extending therethrough, said second apertures each having a first bore and a second bore;

providing a cruciform having a pair of first trunnions and a pair of second trunnions;

providing a pair of first bearing cups;

providing a thrust washer having at least one channel for moving lubricant and at least one indentation for retaining lubricant on an innerface of said thrust washer;

positioning said thrust washers in said first bearing cups;

providing a substantially constant working area for said at least one channel and one indentation between said thrust washer inner face and trunnion end face during use of said universal joint;

mounting said first bearing cups on said first trunnions;

positioning said first bearing cups in said first bores of said first apertures such that end segments thereof extend into said second bores of said first apertures;

providing a pair of retention members each having first and second surfaces;

inserting said retention members into said second bores of said first apertures such that said first surface of said retention member engages said end segment of said first bearing cups;

aligning said first rotary axis of said first rotary member with respect to said second rotary axis of said second rotary member; and deforming a portion of said first legs on said first yoke to define projections which extend into said second bores and engage said second surface of said retention members.

16. The method of claim 15 further comprising the steps of:

providing a second thrust washer having at least one channel for moving lubricant and at least one indentation for retaining lubricant;

positioning said second thrust washers in said second bearing cups;

mounting a pair of second bearing cups on said pair of second trunnions;

positioning said second bearing cups in said first bores of said second apertures such that end segments of said second bearing cups extend into said second bores of said second apertures;

inserting a second retention member having first and second surfaces into each of said second bores of said second apertures such that said first surface of said second retention member engages said end segment of said second bearing cups;

aligning said second rotary axis of said second rotary member with respect to said first rotary axis of said first rotary member; and deforming a portion of said second legs on said second yoke to define projections which extend into said second bores and engage said second surface of said second retention members.

17. The method of claim 16 wherein a staking operation is employed in said deformations step.

18. The method of claim 17 wherein a peening operation is employed in said deformations step.

19. The method of claim 15 wherein each of said first legs includes a series of lugs located adjacent to said second bore of said first aperture, and wherein said deforming step includes deforming said lugs to define a series of radial retention lugs which engage said second surface of said retention member.

20. The method of claim 15 wherein each of said first legs includes an upstanding annular rim segment which surrounds said second bore of said first aperture, and wherein said deforming step includes deforming said rim segment to define a continuous retention flange which engages said second surface of said retention member.

21. The method of claim 15 wherein said projections define continuous flanges.

22. The method of claim wherein 15 said projections define a series of dimpled projections.

23. The method of claim 15 wherein said deformation step is performed sequentially for defining a projection on one of said first legs prior to the other of said first legs.

24. The method of claims 15 wherein said deformation step is performed to simultaneously define said projections on both of said first legs.

25. A universal joint comprising:
a first yoke adapted to be rotated about a first rotary axis, said first yoke including a pair of first legs each having a first throughbore defined by a first bore and a second bore;
a second yoke adapted to be rotated about a second rotary axis, said second yoke including a pair of second legs each having a second throughbore defined by a first bore and a second bore;
a cruciform having a pair of first trunnions and a pair of second trunnions;
a pair of first bearing cups mounted on said first trunnions and positioned in said first bores of said first throughbores such that end segments thereof extend into said second bores;
a pair of second bearing cups mounted on said second trunnions and positioned in said first bores of said second throughbores such that end segments thereof extend into said second bores
thrust washers positioned at an end of said trunnions adjacent said bearing cups, said thrust washers having at least one channel for moving lubricant and at least one indentation for retaining lubricant;
retention members positioned in said second bores of said first and second throughbores such that a first surface of said retention members engage said end segments of said first and second bearing cups;
wherein said rotary axis of said first yoke is aligned with respect to said rotary axis of said second yoke and a portion of said first and second legs are deformed to define projections which engage a second surface of said retention members.

26. The universal joint of claim 25 wherein said portion of said first and second legs deformed to define said projections includes a series of lugs extending outwardly from each of said first and second legs adjacent to said second bore.

27. The universal joint of claim 26 wherein said lugs are deformed such that said projections defines a series of radial retention lugs which engage said second surface of said retention member.

28. The universal joint of claim 25 wherein said portion of said first and second legs deformed to define said projections is a wall surface surrounding said second bore.

29. The universal joint of claim 28 wherein said projections are continuous flanges which engage said second surface of said retention members.

30. The universal joint of claim 28 wherein said projections are a series of dimpled projections which engage said second surface of said retention members.

31. The universal joint of claim 25 wherein said portion of said first and second legs deformed to define said projection is an upstanding annular rim segment surrounding said second bore.

32. The universal joint of claim 31 wherein said rim segment is deformed such that said projections includes a series of radial retention lugs which engage said second surface of said retention members.

33. The universal joint of claim 31 wherein said rim segment is deformed such that said projections define continuous retention flanges which engage said second surface of said retention members.

34. The universal joint of claim 25 wherein said projections defines a retention aperture which communicates with and is smaller than said second bore of said throughbores.

35. The universal joint of claim 34 wherein said bearing cups have an outer diameter that is slightly smaller than an inner diameter of said first bore, and wherein said retention aperture has an inner diameter that is larger than said outer diameter of said bearing cups.

36. The universal joint of claim 34 wherein said retention members can be removed from a groove defined between said projections and said second bore and thereafter pass through said retention aperture.

37. The universal joint of claim 36 wherein said retention member is a snap ring.

38. The universal joint of claim 1 wherein said at least one thrust washer indentation trapping impurities in said lubricant.

* * * * *